United States Patent
Korkin et al.

(10) Patent No.: US 10,854,003 B2
(45) Date of Patent: Dec. 1, 2020

(54) VISUALIZATION OF NETWORK DATA AS A THREE-DIMENSIONAL HIERARCHICAL DATA STRUCTURE IN A MIXED REALITY ENVIRONMENT

(71) Applicant: WORCESTER POLYTECHNIC INSTITUTE, Worcester, MA (US)

(72) Inventors: Dmitry Korkin, Worcester, MA (US); Pavel Terentiev, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/871,632

(22) Filed: Jan. 15, 2018

(65) Prior Publication Data
US 2019/0221039 A1    Jul. 18, 2019

(51) Int. Cl.
*G06T 19/00* (2011.01)
*G06F 3/01* (2006.01)
*G02B 27/01* (2006.01)
*G06T 17/00* (2006.01)
*G06F 3/0481* (2013.01)

(52) U.S. Cl.
CPC .......... *G06T 19/006* (2013.01); *G02B 27/017* (2013.01); *G06F 3/013* (2013.01); *G06F 3/04815* (2013.01); *G06T 17/005* (2013.01)

(58) Field of Classification Search
None
See application file for complete search history.

(56) References Cited

U.S. PATENT DOCUMENTS

| | | | |
|---|---|---|---|
| 6,020,891 A * | 2/2000 | Rekimoto | G06F 3/04815 345/419 |
| 9,665,988 B2 | 5/2017 | Djorgovski et al. | |
| 9,704,298 B2 | 7/2017 | Espeset et al. | |
| 2008/0123586 A1 | 5/2008 | Manser | |
| 2012/0056903 A1* | 3/2012 | Shinohara | G06F 3/013 345/676 |
| 2017/0053445 A1 | 2/2017 | Chen et al. | |

(Continued)

OTHER PUBLICATIONS

Daniel Belcher et al, "Using Augmented Reality for Visualizing Complex Graphs in Three Demensions", Proceedings of the Second IEEE and ACM International Symposium on Mixed and Augmented Reality, 2003.

(Continued)

*Primary Examiner* — Nicholas J Lee
(74) *Attorney, Agent, or Firm* — Duquette Law Group, LLC

(57) ABSTRACT

Embodiments of the innovation relate to a mixed reality device having a mixed reality display and a controller disposed in electrical communication with the mixed reality display. The controller configured to receive topology data associated with a network and three-dimensional (3D) embedded network data associated with the network. The controller is configured to construct a hierarchical data structure from the topology data and the 3D embedded network data. The controller is also configured to display a level of the hierarchical data structure as a virtual object in a 3D space on the mixed reality display, the level of the hierarchical data structure identifying a subset of nodes and a subset of edges of the hierarchical data structure.

29 Claims, 9 Drawing Sheets

(56) References Cited

U.S. PATENT DOCUMENTS

2017/0287225 A1* 10/2017 Powderly .............. G06T 19/006

OTHER PUBLICATIONS

C. Hurter et al, Into the mixed reality data sphere: mapping user's movements to data exploration tool, Workshop on Immersive Analytics at IEEE VIS, Oct. 1, 2017.
Aliakbar Panahi, "Big Data Visualization Platform for Mixed Reality", Virginia Commonwealth University, VCU Scholars Compass, 2017.
Aileen McGraw, "Making Mixed Reality: a Conversation With Alexandros Sigaras and Sophia Roshal", Microsoft Windows Experience, Sep. 13, 2017, https:/blogs.windows.com/windowsexperience; Visited May 20, 2019.
Christof Karmonik et al, "Workflow for Visualization of Neuroimaging Data with an Augmented Reality Device", J. Digit Imaging (2018) 31:26-31, Published online Jul. 6, 2017.
Steve Beitzel et al, "Exploring 3D Cybersecurity Visualization with the Microsoft HoloLens" Advances in Human Factors in Cybersecurity, part of the Advances in Intelligent Systems and Computing 593, Springer International Publishing AG 2018.
Michael Peters, "HoloLens: Interactive Visulization", Published Jan. 22, 2017, https://www.youtube.com/watch?v=PE2DStC0flg&feature=share; Visited Jun. 18, 2019.
Michael Peters, HoloLens: Inside the 'Data Room', Published Jan. 4, 2018, https://www.youtube.com/watch?v=uOEtnZUinfs; Visited Jun. 18, 2019.

* cited by examiner

VISUALIZATION OF NETWORK DATA AS A THREE-DIMENSIONAL HIERARCHICAL DATA STRUCTURE IN A MIXED REALITY ENVIRONMENT

GOVERNMENT LICENSE RIGHTS

This invention was made with government support under Grant #DBI-1458267 awarded by the National Science Foundation (NSF). The government has certain rights in the invention.

BACKGROUND

In a variety of data-intensive fields of study, including biology, finance, computer science, and the pharmaceutical and biotech industries, interrelated data elements can be visualized as a network. For example, complex diseases such as cancer, diabetes, and heart disorders can be represented as relatively large biomolecular networks formed by the genes implicated in the disease. These networks are typically presented visually in a two-dimensional space as a series of objects or nodes having edges that connect related nodes.

SUMMARY

Conventional network visualization approaches suffer from a variety of deficiencies. For example, regardless of the field of study, visualization of relatively large networks typically does not allow a user to intuitively understand the real-world objects represented by the structure or the phenomenon identified by the visualized network. For example, when complex networks are visually represented in a two-dimensional space, nodes and edges can overlap one another. With such conventional depiction, it can be difficult for user to fully visualize and understand the relationships among the nodes. This can lead to an incomplete understanding of the phenomena represented by the visual representation of the network.

Further, the visual representation of relatively large networks in a two-dimensional space can provide information that is typically beyond the capacity of human perception. For example, FIG. 1 represents a visual depiction of a molecular network 5 for an ovarian cancer cell. This two-dimensional representation of a relatively complex biological network depicts a relatively complex and dense system of nodes and connections. With such a complex depiction, it becomes nearly impossible for a user to intuitively understand the intricacies of the underlying system structure and/or the irregularities that occur therein.

By contrast to conventional visualization techniques, embodiments of the present innovation relate to visualization of network data as a three-dimensional (3D) hierarchical data structure in a mixed reality environment. In one arrangement, a mixed reality device is configured to allow a user to visualize and manipulate static or dynamically-changing network data as a 3D structure as part of a mixed reality image. For example, the mixed reality device is configured to map the physical environment of the user's surroundings and bind it to an artificial holographic coordinate system. With such binding, the mixed reality device can visually represent all nodes (i.e., objects) and edges (i.e., interconnections) associated with the network data. By projecting the hierarchical data structure as a 3D structure as part of a mixed reality image, the mixed reality device provides the user with an intuitive way to interact and understand the data. For example, 3D visualization of the hierarchical data structure as part of a mixed reality image versus a two-dimensional representation of the network data on a monitor provides the human brain with a clearer way to identify interconnections between nodes. Further, 3D visualization of the hierarchical data structure as part of a mixed reality image allows the user to walk through the visual representation of the network, which is, in itself, a more natural method for exploration. Additionally, the mixed reality device allows for a natural hand gesture manipulation without the need of additional devices, allows intuitive anchoring of the virtual object to the surroundings of the real-world environment, and allows for a natural collaborative interaction, such as when users wearing mixed reality devices can interact with each other and with the holographic hierarchical data structure object simultaneously.

In one arrangement, the mixed reality device is also configured to display network data as a hierarchical data structure such that, at each level of hierarchy, only a subset of edges and nodes are shown. Each level of the hierarchy includes a predefined information link between the two neighbor levels. The information link allows the user to change the network representation from a coarser-grain view (level k) to a finer-grain, more detailed, view (level k+1). The hierarchical representation of the network data provides the user with the ability to efficiently visualize, process, and manipulate the network information.

In one arrangement, the mixed reality device is configured to provide interactive manipulation of the network using object manipulation input commands, such as gaze input, gesture input, and voice input commands. In response to one or more of these commands, the mixed reality device allows the user to traverse, rotate, scale, and/or move the hierarchical data structure, as well as to search for particular information in the network.

In one arrangement, each node in the hierarchical data structure can include a number of features, such as an image, video, chart, plot, or text, for example. For example, features related to the nodes (i.e., objects) and edges (i.e., interconnections) associated with the network data can be mapped on the hierarchical data structure and interactively accessed by the user, such as by providing a gesture command relative to a corresponding node or edge.

In one arrangement, the mixed reality device is configured to provide the user with assistance in retrieving significant information related to the nodes and edges of the hierarchical data structure. For example, the mixed reality device can interact with the user and can suggest if there is significant information in certain regions of a complex network, such as if there are nodes and edges that are related to a particular node based on the available data. In one arrangement, for specific nodes and/or edges that are determined by the system to be important for a specific task, the mixed reality device can highlight such nodes in a visibly distinct manner to identify these nodes to the user.

In one arrangement, embodiments of the innovation relate to, in a mixed reality device, a method for displaying a network structure. The method includes receiving, by the mixed reality device, topology data associated with a network and three-dimensional (3D) embedded network data associated with the network. The method includes constructing, by the mixed reality device, a hierarchical data structure from the topology data and the 3D embedded network data. The method includes displaying, by the mixed reality device, a level of the hierarchical data structure as a virtual object in a 3D space on a mixed reality display, the level of the hierarchical data structure identifying a subset of nodes and a subset of edges of the hierarchical data structure.

In one arrangement, embodiments of the innovation relate to a mixed reality device having a mixed reality display and a controller disposed in electrical communication with the mixed reality display. The controller is configured to receive topology data associated with a network and three-dimensional (3D) embedded network data associated with the network. The controller is configured to construct a hierarchical data structure from the topology data and the 3D embedded network data. The controller is also configured to display a level of the hierarchical data structure as a virtual object in a 3D space on the mixed reality display, the level of the hierarchical data structure identifying a subset of nodes and a subset of edges of the hierarchical data structure.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Embodiments of the present innovation relate to visualization of network data as a three-dimensional (3D) hierarchical data structure in a mixed reality environment. In one arrangement, a mixed reality device is configured to allow a user to visualize and manipulate static or dynamically-changing network data as a 3D structure as part of a mixed reality image. For example, the mixed reality device is configured to map the physical environment of the user's surroundings and bind it to an artificial holographic coordinates system. With such binding, the mixed reality device can visually represent all nodes (i.e., objects) and edges (i.e., interconnections) associated with the network data. By projecting the network data as a 3D structure as part of a mixed reality image, the mixed reality device provides the user with an intuitive way to interact and understand the data. For example, 3D visualization of the hierarchical data structure as part of a mixed reality image versus a two-dimensional representation of the network data on a monitor provides the human brain with a clearer way to identify interconnections between nodes. Further, 3D visualization of the hierarchical data structure as part of a mixed reality image allows the user to walk through the visual representation of the network, which is, in itself, a more natural method foe exploration.

Figure 2:
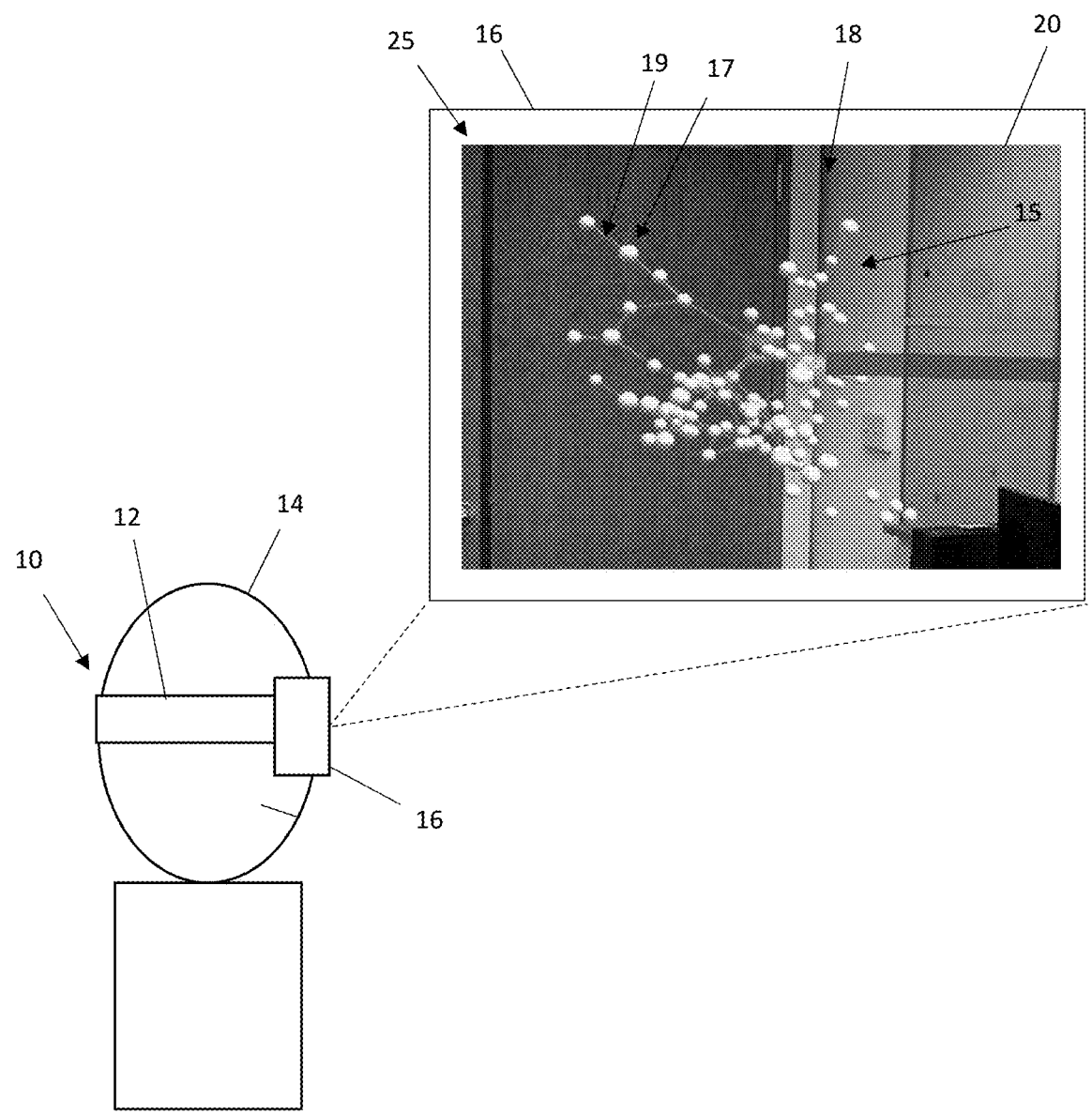
FIG. 2 illustrates a schematic representation of a mixed reality device and a virtual object provided by the mixed reality device, according to one arrangement.

FIG. 2 illustrates a schematic representation of a mixed reality device 10, according to one arrangement. As illustrated, the mixed reality device 10 includes a headpiece 12, which is worn by a user on the user's head 14, and a mixed reality display 16 which is disposed in the vicinity of the user's eyes. During operation, the mixed reality device 10 is configured to display a level of a hierarchical data structure 15 as a virtual object 18 in conjunction with a real-world 3D environment 20. Taken together, the virtual object 18 and real-world 3D environment 20 form a mixed reality image 25.

In one arrangement, a hierarchical data structure is defined as a layout of nodes 17 (i.e., objects), as represented as 3D graphical objects, and edges 19 (i.e., interconnections) which interconnect the nodes 17. When displaying a level of the hierarchical data structure 15, as shown in FIG. 2, the mixed reality device 10 can display each node 17 with different geometrical shapes such as spheres, cubes, cylinders, or custom shapes for example. In one arrangement, the mixed reality device 10 utilizes these different geometrical shapes to distinguish certain nodes from other nodes based upon a distinguishing characteristic, such as domain type, value, or metric differences for example. Further, the mixed reality device 10 can display each edge 19 with a geometrical shape which is distinct from the shape of the nodes 17. For example, the edges 19 can be displayed as straight lines between related or interconnected nodes 17.

As indicated in FIG. 2, and as will be described in detail below, the mixed reality device 10 allows the user to view both the virtual object 18 in conjunction with real-world surroundings, such as indicated by real-world 3D environment 20 on the mixed reality display 16. By projecting a level of the hierarchical data structure 15 as a 3D object 18 as part of a hologram and as part of a mixed reality image 25, the mixed reality device 10 provides the user with an intuitive way to interact and understand the underlying network data which is represented as the hierarchical data structure 15.

Figure 3:
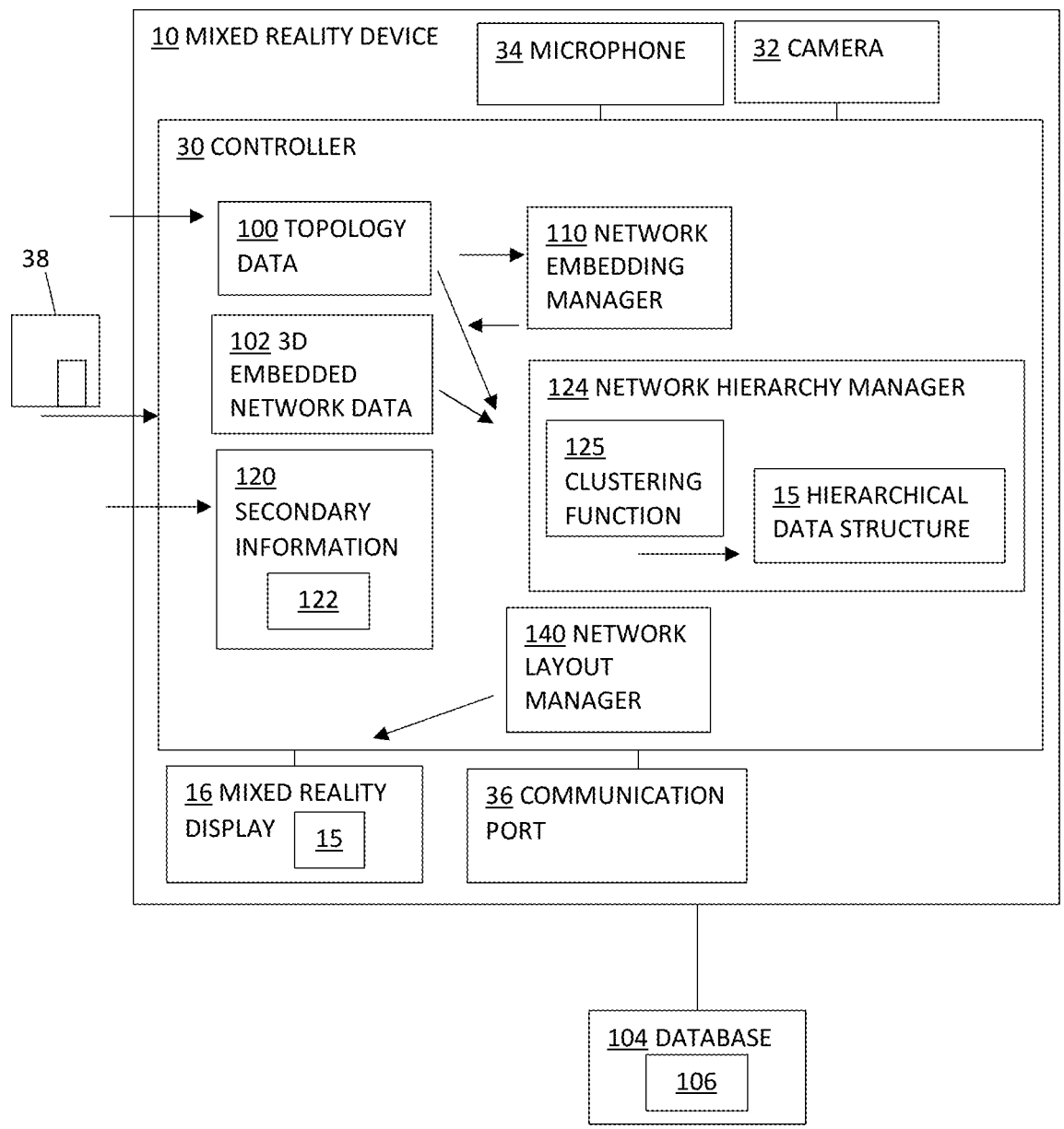
FIG. 3 illustrates a schematic representation of the mixed reality device of FIG. 2, according to one arrangement.

FIG. 3 illustrates a schematic representation of the mixed reality device 10 of FIG. 2, according to one arrangement. For example, the mixed reality device 10 is configured as a computerized device having a controller 30, such as a memory and a processor. The mixed reality device 10 can include one or more cameras 32 disposed in electrical communication with the controller 30 and configured to capture the real-world 3D environment as viewed by the user. For example, the cameras 32 can be configured to capture a stereoscopic moving image of the real-world 3D environment 20 and to send the image to the controller 30 for further transmission to the mixed reality display 16.

As provided above, the mixed reality device 10 includes a mixed reality display 16. For example, the mixed reality display 16 can be a liquid crystal on silicon (LCOS) display, a transmissive liquid crystal display (LCD), or a matrix arrays of LEDs. In one arrangement, the mixed reality display 16 is disposed in electrical communication with the controller 30 and is configured to provide the mixed reality image 25 to a user. For example, the mixed reality display 16 is configured to display a combination of the real-world 3D environment 20 image and the virtual object 18 image, as received from the controller 30, as the mixed reality image 25 to the user.

In one arrangement, the mixed reality device 10 can also include one or more microphones 34 and a communication port 36, each disposed in electrical communication with the controller 30. The microphones 34 are configured to receive audio input from the user and to provide the audio input as an audio signal to the controller 30. The communication port 36 is configured to exchange communications with a device, such as a computerized device or database, external to the mixed reality device 10. For example, the communication port 36 can be a wired interface or a wireless, such as a Wifi interface or a Bluetooth interface.

It is noted that while the mixed reality device 10 can be configured in a variety of ways, in one arrangement, the mixed reality device 10 is configured as a MICROSOFT HoloLens device as produced by Microsoft Corporation, Redmond, Wash.

The controller 30 of the mixed reality device 10 can store an application for visualizing network data as a 3D hierarchical data structure in a mixed reality environment. The visualization application installs on the controller 30 from a computer program product 38. In some arrangements, the computer program product 38 is available in a standard off-the-shelf form such as a shrink wrap package (e.g., CD-ROMs, diskettes, tapes, etc.). In other arrangements, the computer program product 38 is available in a different form, such downloadable online media. When performed on the controller 30 of the mixed reality device 10, the visualization application causes the mixed reality device 10 to display a 3D hierarchical data structure 15 and a real-world 3D environment image 20 as part of a mixed reality image 25. Further, when performed on the controller 30 of the mixed reality device 10, the visualization application causes the mixed reality device 10 to receive object manipulation input from a user and to adjust the display of the hierarchical data structure 15 on the mixed reality display 16.

As provided above, during operation, the mixed reality device 10 is configured to display network data as a hierarchical data structure 15 on a mixed reality display 16. The following provides a description of an example of such an operation of the mixed reality device 10.

Before network data that is under investigation can be visualized by the mixed reality device 10, the mixed reality device 10 first receives the network data, such as from an external database, and formats the network data to include all interconnections between nodes, their parameters, and spatial coordinates for display. For example, with reference to FIG. 3, the mixed reality device 10 is configured to receive node attribute information, topology data 100 associated with a network, and 3D embedded network data 102 associated with the network.

In one arrangement, the node attribute information identifies certain parameters associated with a particular node while the topology data 100 identifies the interconnections or relationships among the nodes. For example, assume the case where the mixed reality device 10 accesses a database 104 which includes molecular network data 106. In such a case, the molecular network data 106 can include, as node attribute information, identification of the proteins that define the network and topology data 100 that identifies the relationships among the nodes or proteins.

In one arrangement, the mixed reality device 10 is configured to develop the 3D embedded network data 102 based upon the topology data 100. For example, the mixed reality device 10 can include a network embedding manager 110 configured to apply an embedding function to the topology data 100 to generate the 3D embedded network data 102. As a result of the application of the embedding function to the topology data 100, the 3D embedded network data 102 identifies an artificial, spatial coordinate for each node of the topology data 100. These spatial coordinates relate to a mapping location of the node in 3D space. The mixed reality device 10 is configured to bind the artificial, spatial coordinates of the nodes of the molecular network, as provided by the 3D embedded network data 102, with a real-world, physical coordinate system as displayed by the mixed reality display 16. For example, by binding the artificial coordinates of the nodes to the real world coordinates, the mixed reality device 10 provides the user with the ability to gain both a perceptional and functional meaning to the display of the hierarchical data structure 17.

The network embedding manager 110 can be configured to provide additional processing of the topology data 100 and/or the 3D embedded network data 102. In one arrangement, the network embedding manager 110 is configured to provide spatial mapping attributes to the 3D embedded network data 102. The level of understanding that the user can gain from the binding of the artificial coordinates to the real world coordinates can depend on how the nodes are grouped in space. As such, the network embedding manager 110 can be configured to provide, as a spatial mapping attribute, an indication of the strength of interaction between nodes. For example, the network embedding manager 110 can provide the interaction strength as a distance between adjacent nodes.

As provided above, the mixed reality device 10 is configured to develop the 3D embedded network data 102 based upon the topology data 100. However, in one arrangement, the mixed reality device 10 can receive the 3D embedded network data 102 from an external source, such as from database 104, along with the node feature information and topology data 100.

In one arrangement, in addition to receiving the topology data 100 and the 3D embedded network data 102, the mixed reality device 10 can receive secondary information 120 related the nodes of the network. The secondary information 120 can be configured in a variety of ways. In one arrangement, the secondary information 120 can relates to a knowledge-domain feature 122 associated with a corresponding node. For example, assume the case each node of a molecular network represents a protein. Each protein can have one or more knowledge-domain features associated with it such as, for example, a number of domains in the protein, a cellular location of the protein (nucleus, cytoplasm, membrane), a disease association, an expression of the gene corresponding to the protein in exact tissue, or a particular structure, mutation, or drug interaction. These knowledge-domain features 122 can be stored in a database local to the mixed reality device and mapped to each associated node. As will be described in detail below, the user can access these knowledge-domain features 122 while traversing the hierarchical data structure 15 as provided on the mixed reality display 16.

Next, with continued reference to FIG. 3, the mixed reality device 10 is configured to construct a hierarchical data structure 15 from the topology data 100 and the 3D embedded network data 102.

Figure 1:
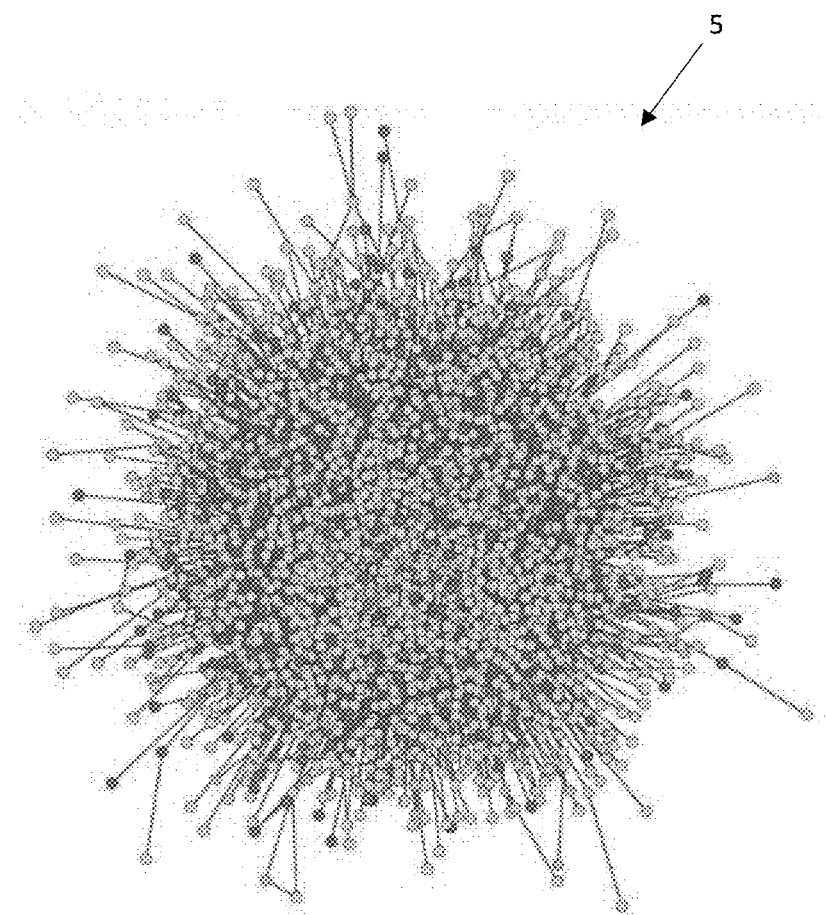
FIG. 1 illustrates a prior art depiction of a molecular network for an ovarian cancer cell.

For example, the topology data 100 in combination with the 3D embedded network data 102 can include hundreds of thousands of network elements having associated 3D coordinates. As indicated in FIG. 1, the visual presentation of such a network can be relatively complex and can lack information regarding the real-world phenomenon identified by the network. In order to allow for an intuitive visual presentation of a network structure, the mixed reality device 10 is configured to provide the topology data 100, in combination with the 3D embedded network data 102, as a hierarchical data structure 15. With such presentation, connections between the nodes 17 are represented as a hierarchical tree in which each level corresponds to some level of node aggregation. The resulting hierarchical data structure 15 can represent a relatively clear and intuitively perceptible data layout of a network and can reduce the computational costs associated with the visualization and manipulation of relatively large amounts of network data.

In one arrangement, the mixed reality device 10 includes a network hierarchy manager 124 which is configured to store the topology data 100, the 3D embedded network data 102, and the secondary information 120 (e.g., network data) for a given network that is under visualization process and to hierarchically organize this network data. In one arrangement, the hierarchical organization of the network data can be represented as a tree having a root, a cluster, and a leaf. The root element is the only element of the hierarchy tree that has no parents and has children configured as clusters on the highest level of hierarchy. The cluster element can have both children and one or more parent. The leaf element is related to the bottom level of the hierarchy tree that has no children elements.

In one arrangement, the network hierarchy manager 124 is configured to apply a clustering function 125 to the topology data 100, the 3D embedded network data 102, and the secondary information 120 to define the hierarchy structure. Clustering is the task of data classification in such a way that the data elements or nodes in the same group, called a cluster, are more similar to each other than to the objects in other groups or clusters based on different characteristics. Clustering is a conventional technique for statistical data analysis, used in many fields, including machine learning, pattern recognition, image analysis, information retrieval, and bioinformatics. The grouping of nodes into clusters can be achieved by various algorithms that differ significantly in the definition of what constitutes a cluster and how to efficiently find them. For example, known clustering algorithms include hierarchical clustering, centroid-based clustering (i.e., K-Means Clustering), distribution based clustering, and density based clustering.

During operation, when constructing the hierarchical data structure 15 in one arrangement, the network hierarchy manager 124 is configured to apply the clustering function 125 to the topology data 100, the 3D embedded network data 102 and the secondary information 120 to define a set of nodes 17 and a set of edges 19 representing relationships among certain nodes of the set of nodes. For example, with reference to FIG. 4, assume the case where the topology data 100, the 3D embedded network data 102 and the secondary information 120 identifies a set of network elements 126 and a set of edges 128 representing relationships among certain network elements 126. Application of the clustering function 125 to the network elements 126 and edges 128 aggregates certain elements 126 based upon some common relationship among the elements. For example, as illustrated, application of the clustering function 125 to the topology data 100, the 3D embedded network data 102 and the secondary information 120 groups elements 126-1 through 126-4 as a first cluster 130-1, elements 126-5 through 126-7 as a second cluster 130-2, elements 126-8 through 126-10 as a third cluster 130-3, and elements 126-11 through 126-13 as a fourth cluster 130-4.

The network hierarchy manager 124 is configured to then substitute each cluster 130 with a single node 17 corresponding to that cluster 130 and provide corresponding edges 19 among the nodes 17. For example, the network hierarchy manager 124 replaces the first cluster 130-1 with a first node 17-1, the second cluster 130-2 with a second node 17-2, the third cluster 130-3 with a third node 17-3, and the fourth cluster with a fourth node 17-4. Further, in the example provided, the clustering function 125 defines edges 19-1 through 19-3 between node 17-1 and nodes 17-2 through 17-4.

Figure 4:
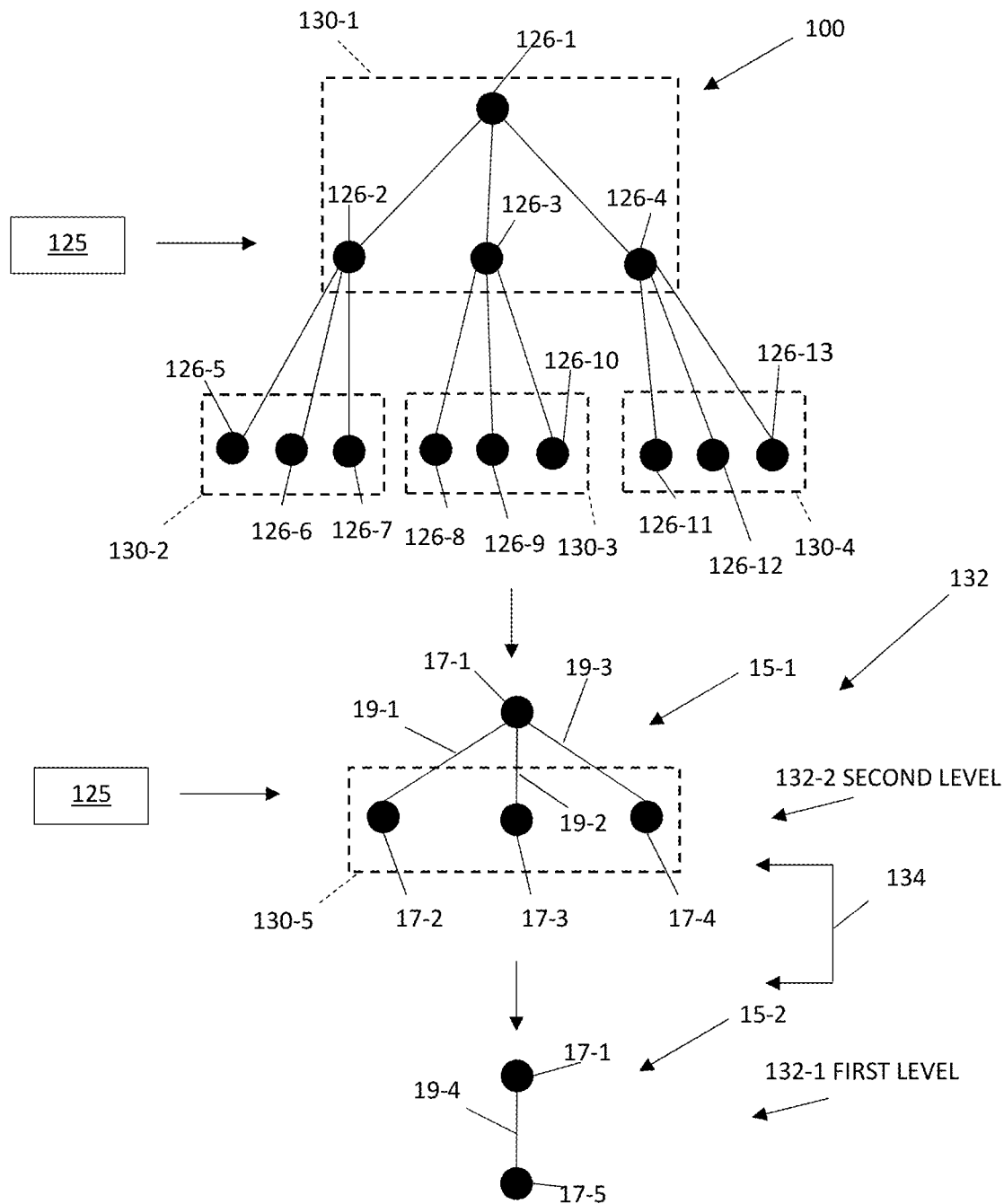
FIG. 4 illustrates a schematic representation of an application of a clustering function to network data to form a hierarchical data structure, according to one arrangement.

To further aggregate the resulting hierarchical data structure 15-1, in one arrangement, the network hierarchy manager 124 is configured to apply the clustering function 125 to the hierarchical data structure 15-1 for additional iterations. For example, as illustrated in FIG. 4, application of the clustering function 125 to the hierarchical data structure 15-1 can group nodes 17-2 through 17-4 as a fifth cluster 130-5 and can define edge 19-4 between node 17-1 and 17-5. With application of the clustering function 125 to the topology data 100, the 3D embedded network data 102 and the secondary information 120 and then iteratively to the resulting nodes 17 and edges 19, the network hierarchy manager 124 defines a set of levels 132 associated with the hierarchical data structure 132.

For example, with continued reference to FIG. 4, based on application of the clustering algorithm 125, the mixed reality device 10 defines a first level 132-1 and a second level 132-2 where the first level 132-1 (level k) provides a coarser-grain representation of the topology data 100, the 3D embedded network data 102 and the secondary information 120 and the second level 132-2 (level k+1) provides a finer-grain, more detailed representation of the topology data 100, the 3D embedded network data 102 and the secondary information 120. Accordingly, each level of the set of levels 132 represents a subset of nodes 17 and a subset of edges 19 of the hierarchical data structure 15. As a result, the network hierarchy manager 124 aggregates the global network structure of the topology data 100, the 3D embedded network data 102 and the secondary information 120 into a hierarchical organization.

Further, based on application of the clustering algorithm 125, the network hierarchy manager 124 can define an information link 134 between two neighboring levels of the set of levels 132. For example, as shown in FIG. 4, the information link 134 defines a relationship or association between the node 17-5 in the first level 132-1 of the hierarchical data structure 15 and the nodes 17-2 through 17-4 in second level 132-2 of hierarchical data structure 15. The information link 134 can be stored in either a local or external database 104 and allows the network hierarchy manager 124 to identify and display either finer or coarser grained hierarchical data structures 15 as the user traverses a particular hierarchical data structures 15 as provided on the mixed reality display 16.

Next, returning to FIG. 3, the mixed reality device 10 is configured to display a level 132 of the hierarchical data structure 15 as a virtual object 18 in a 3D space on a mixed reality display 16 where the level 132 of the hierarchical data structure identifies a subset of nodes 17 and a subset of edges 19 of the hierarchical data structure 15.

In one arrangement, the mixed reality device 10 includes a network layout manager 140 which is configured to provide the hierarchical data structure 15 from the network hierarchy manager 124 to the mixed reality display 15 as an image. For example, during operation, the network layout manager 140 retrieves information pertaining to nodes 17 and edges 19 of the first level 132-1 of the hierarchical data structure 15 and calls an imaging API from the mixed reality device 10 to form an image from the node 17 and edge 19 information. The network layout manager 140 transmits the image of the first level 132-1 of the hierarchical data structure 15 to the mixed reality display 16, which superimposes the hierarchical data structure image on a real-world 3D environment image, as captured by camera 32. By displaying the first level 132-1 of the hierarchical data structure 15 to the user as a system of nodes 17 and edges 19 between the nodes 17, such as illustrated in FIG. 5, the network layout manager 140 provides the hierarchical data structure 15 at the highest level of abstraction at the start of the process.

Figure 5:
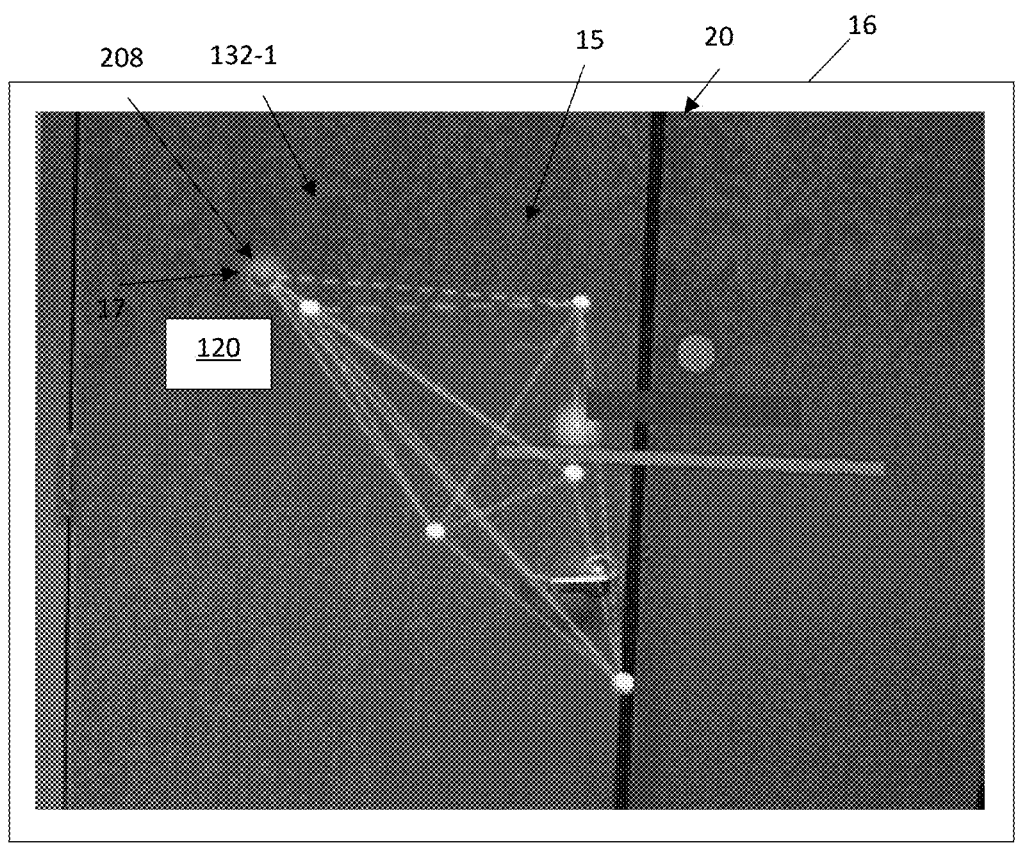
FIG. 5 illustrates a hierarchical data structure as provided by a mixed reality display of the mixed reality device of FIG. 2, according to one arrangement.

As a result, the mixed reality device 10 provides for the visualization of relatively complex network data as a multi-level hierarchical data structure 15 within a real-world 3D environment 20, as illustrated in FIGS. 2 and 5. This hierarchical representation of the network data provides the user with the ability to efficiently visualize, process, and manipulate the network information. Further, this approach can be broadly applied to a variety of fields with demand for visualization of complex networks. For example, the mixed reality device 10 can be used within the pharmaceutical and biotech industry, with hospitals and medical centers, with networking and logistical systems, and in academic research.

With the hierarchical data structure 15 displayed as a virtual object 18 in a 3D space on the mixed reality display 16, in one arrangement, the mixed reality device 10 provides the user with the ability to interact with the hierarchical data structure 15 to better understand the various aspects of the imaged network. In one arrangement, with reference to FIG. 6, the mixed reality device 10 identifies user interaction with the hierarchical data structure 15 based upon the receipt of object manipulation input 200 from the user. In response to receiving the object manipulation input 200, the mixed reality device 10 can adjust the display of the hierarchical data structure 215 on the mixed reality display 16.

For example, as will be described below, based on the receipt of object manipulation input 200 from the user, the mixed reality device 10 can (1) identify components of the hierarchical data structure 15; (2) provide information regarding components of the hierarchical data structure 15; (3) provide intellectual guidance to the user in the form of hints and navigational information as the user explores the hierarchical data structure 15; (4) return answers to user's questions, search of the objects by some attribute value (name, type, predicate, location), or find longest/shortest path between nodes 17 in the hierarchical data structure 15, for example; (5) manipulate the image of the hierarchical data structure 15 in order to provide a more intuitive spatial representation of the network data; and (6) allow traversal of the hierarchical data structure 15.

In one arrangement, the mixed reality device 10 can be configured to identify components of the hierarchical data structure 15. For example, the mixed reality device 10 can include an active cursor manager 220, which provides a pointer on the mixed reality display 16 which can move about the hierarchical data structure 15 and can highlight particular components of the hierarchical data structure 15 in response to the object manipulation input 200. While the active cursor manager 220 can be responsive to a variety of object manipulation inputs 200, such as voice or gesture, in one arrangement the object manipulation input 200 is configured as gaze input 202 from the user. For example, the gaze input 202 can include head positioning information, such as a position of the user's head 14 relative to the real-world coordinates, or eye position information, such as the position of the user's eyeball relative to the mixed reality display 16. During operation, the gaze input 202 can be implemented as a ray cast from the mixed reality device 10. In the event that the ray cast intersects a component of the hierarchical data structure 15, the active cursor manager 220 can identify that component of the hierarchical data structure 15 on the mixed reality display 16.

Figure 6:
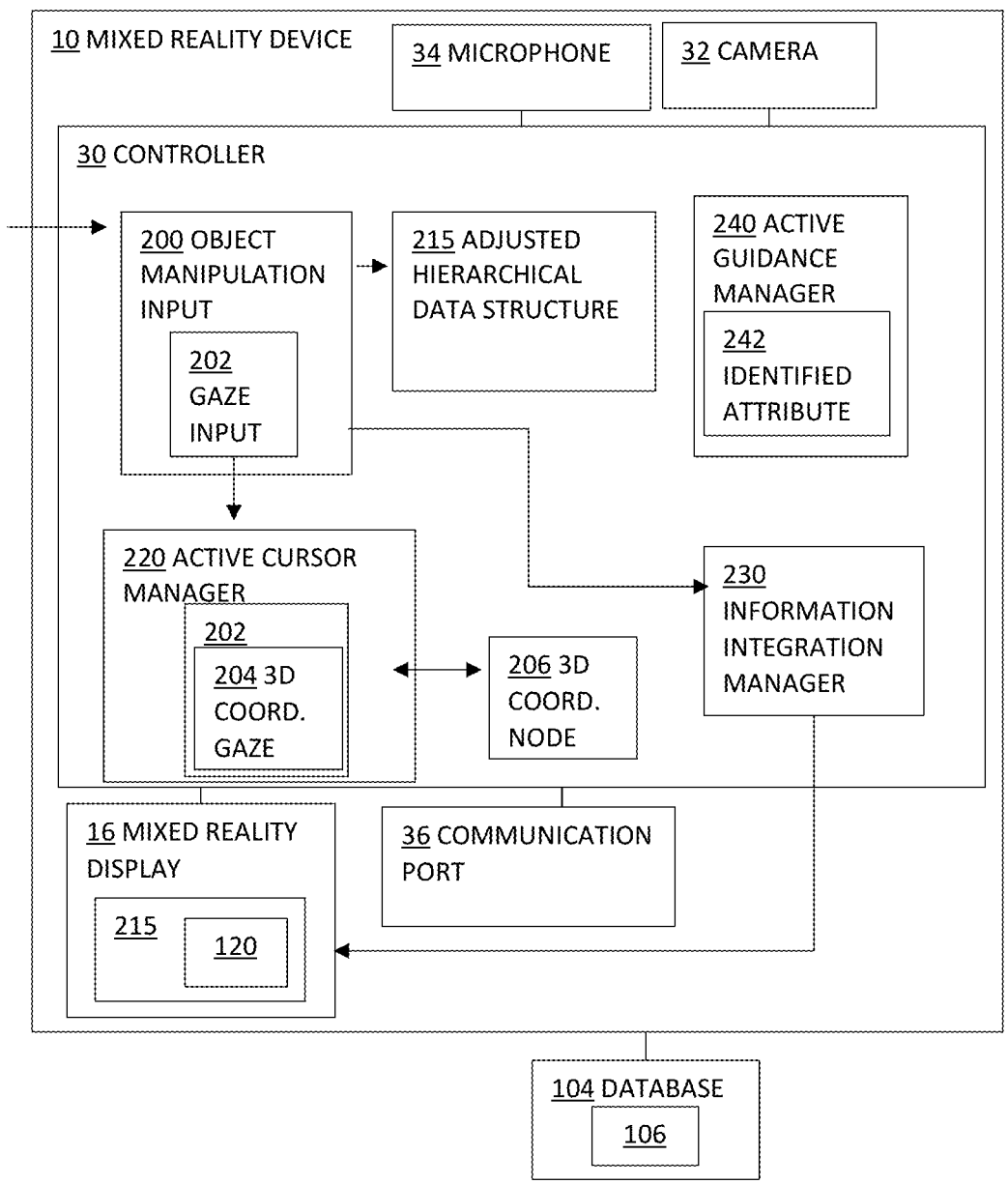
FIG. 6 illustrates a schematic representation of the mixed reality device of FIG. 2, according to one arrangement.

For example, with reference to FIG. 6, during operation, the active cursor manager 220 is configured to receive a gaze input 202 from the user and identify a 3D coordinate 204 associated with the gaze input 202. For example, in the case where the gaze input 202 relates to the position of the user's head, the 3D coordinate 204 relates to the position, in real-world coordinates, of a ray cast from the mixed reality device 10.

Next, the active cursor manager 220 is configured to compare the 3D coordinate 204 associated with the gaze input 202 with a 3D coordinate 206 associated with each node of the subset of nodes. For example, as indicated above, the nodes 17 of the hierarchical data structure 15 include spatial coordinates, as provided by the 3D embedded network data 102, which are bound with a real-world, physical coordinate system as displayed by the mixed reality display 16. Accordingly, the active cursor manager 220 is configured to compare the real-world 3D coordinate 204 associated with the gaze input 202 with the real-world coordinates 206 associated with the nodes 17 of the level of the hierarchical data structure 15 as displayed by the mixed reality display 16.

In the case where the active cursor manager 220 detects a correspondence or overlap between the 3D coordinate 204 associated with the gaze input 202 and the 3D coordinate 206 associated with a node 17 of the hierarchical data structure 15, the active cursor manager 220 is configured to display node identification information 208 associated with that node 17. For example, with reference to FIG. 5, the node identification information 208 can include a highlight around the node 17 of interest. In another example, the identification information 208 can include an interactive help menu display, which appears in the user's view of the mixed reality display 16 and can include the name and/or other characteristics of the node 17.

Returning to FIG. 6, the mixed reality device 10 can be configured to provide information regarding components of the hierarchical data structure 15. For example, the mixed reality device 10 can include an information integration manager 230 which causes the mixed reality display 16 to display additional data or secondary information 120 that is associated with a selected node 17 or region of the network hierarchical data structure 15. Such operation is based upon the receipt of object manipulation input 200 relating to a node 17 of the hierarchical data structure 15.

For example, with reference to FIG. 5, assume the case where the user has highlighted node 17 as a node of interest. The user can further provide a gesture input, such as a hand motion received by the camera 32, as the object manipulation input 200. In response to the object manipulation input 200, the information integration manager 230 causes the mixed reality display 16 to display secondary information 120 relating to the node 17. For example, the secondary information 120 can include knowledge-domain features 122, as provided through the mapped link between the node 17 and the local database (not shown). In another example, the secondary information 120 can include detailed images of the node 17 (e.g., an image of the 3D protein structure represented by the node 17, videos, music, plots, charts, or other 3D objects related to the node 17). In such a case, the information integration manager 230 can retrieve the secondary information 120 from the external database 104.

Returning to FIG. 6, the mixed reality device 10 can be configured to provide intellectual guidance to the user in the form of hints and navigational information as the user explores the hierarchical data structure 15. For example, the mixed reality device 10 can include an active guidance manager 240 which is configured to display an identified attribute 242 regarding one or more nodes 17 in the hierarchical data structure 15. As will be described below, the active guidance manager 240 can be configured to display the identified attributes 242 as either static or dynamic information.

In one arrangement, the active guidance manager 240 is configured to display the identified attribute 242 as static information associated with particular nodes 17 in the hierarchical data structure 15 when a user is engaged with that hierarchical data structure 15. For example, with reference to FIG. 7, assume the case where the hierarchical data structure 15 represents a molecular network and the active guidance manager 240 is configured to provide, as the identified attribute 242, an indication of proteins which include mutations. In such a case, as the user views the layer of the hierarchical data structure 15 through the mixed reality display 16 the active guidance manager 240 identifies particular nodes 17 as having a mutation as the identified attribute 242. For example, as shown, the active guidance manager 240 is configured to display nodes 17 having mutations associated with protein binding with a first identified attribute 242-1 and nodes 17 having mutations associated with phosphorylation with a second identified attribute 242-2.

Figure 7:
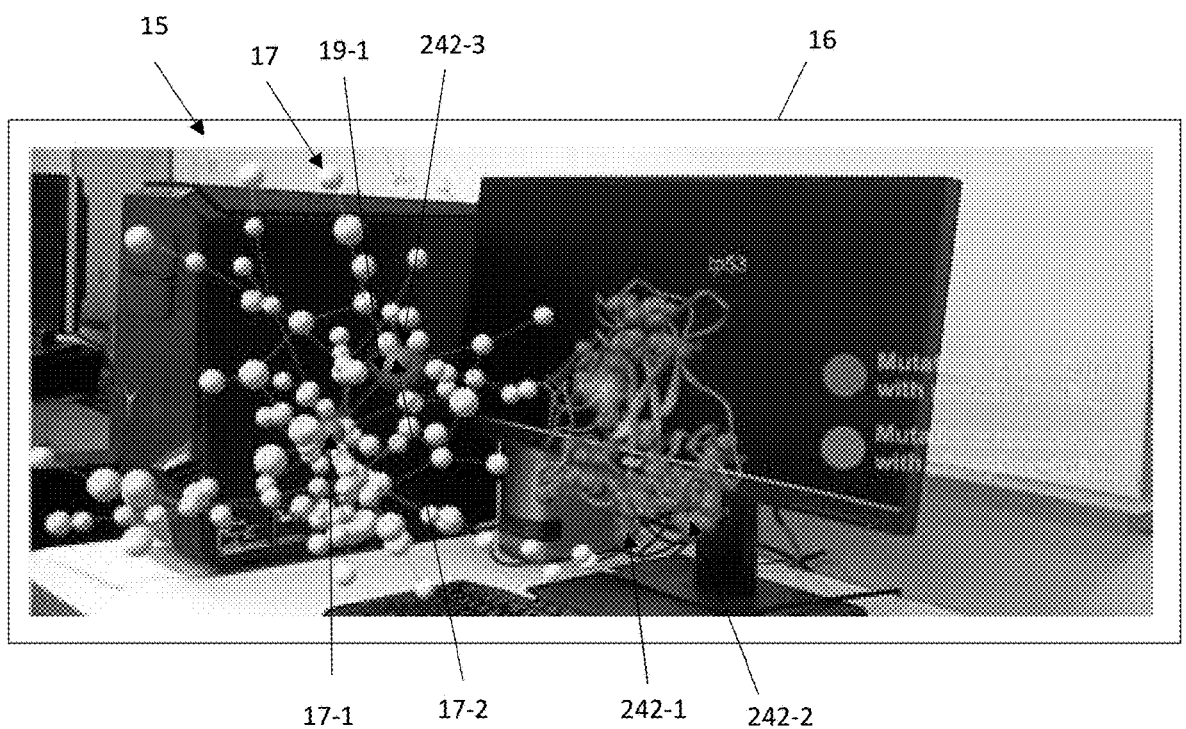
FIG. 7 illustrates a layer of a hierarchical data structure as provided by a mixed reality display of the mixed reality device of FIG. 2, according to one arrangement.

Returning to FIG. 6, in one arrangement, the active guidance manager 240 is configured to display the identified attribute 242 as dynamic information associated with a secondary node 17 in the hierarchical data structure 15 in response to receiving the object manipulation input 200 relative to a related, primary node from the user, such as in conjunction with the active cursor manager 220. For example, assume the case where the active guidance manager 240 is configured to provide, as an identified attribute 242, an indication of nodes which are connected to a selected, or primary, node by an edge 19. With reference to FIG. 7, further assume that the user has identified node 17-1 as a primary node or node of interest, such as through the use of the active cursor manager 220. For example, the mixed reality device 10 can be configured to receive gaze input 202 via the active cursor manager 220. When the active cursor manager 220 identifies a particular node 17-1 as a node of interest, the active guidance manager 240 can receive such identification an object manipulation input 200. In response to receiving such identification as object manipulation input 200, the active guidance manager 240 is configured to identify secondary node 17-2 as having an attribute related to the primary node 17-1 (i.e., such as by a connection via edge 19-1). In one arrangement, the active guidance manager 240 is configured to provide, as the identified attribute 242-3, a halo around the secondary node 17-2. Further, in response to receiving the object manipulation input 200, the active guidance manager 240 can provide, as dynamic information, the name of the identified node 17-1. In one arrangement, the active guidance manager 240 is configured to switch between different features of the nodes 17 to be dynamically indicated, based upon input from a manipulation manager 250, as described below.

Figure 8:
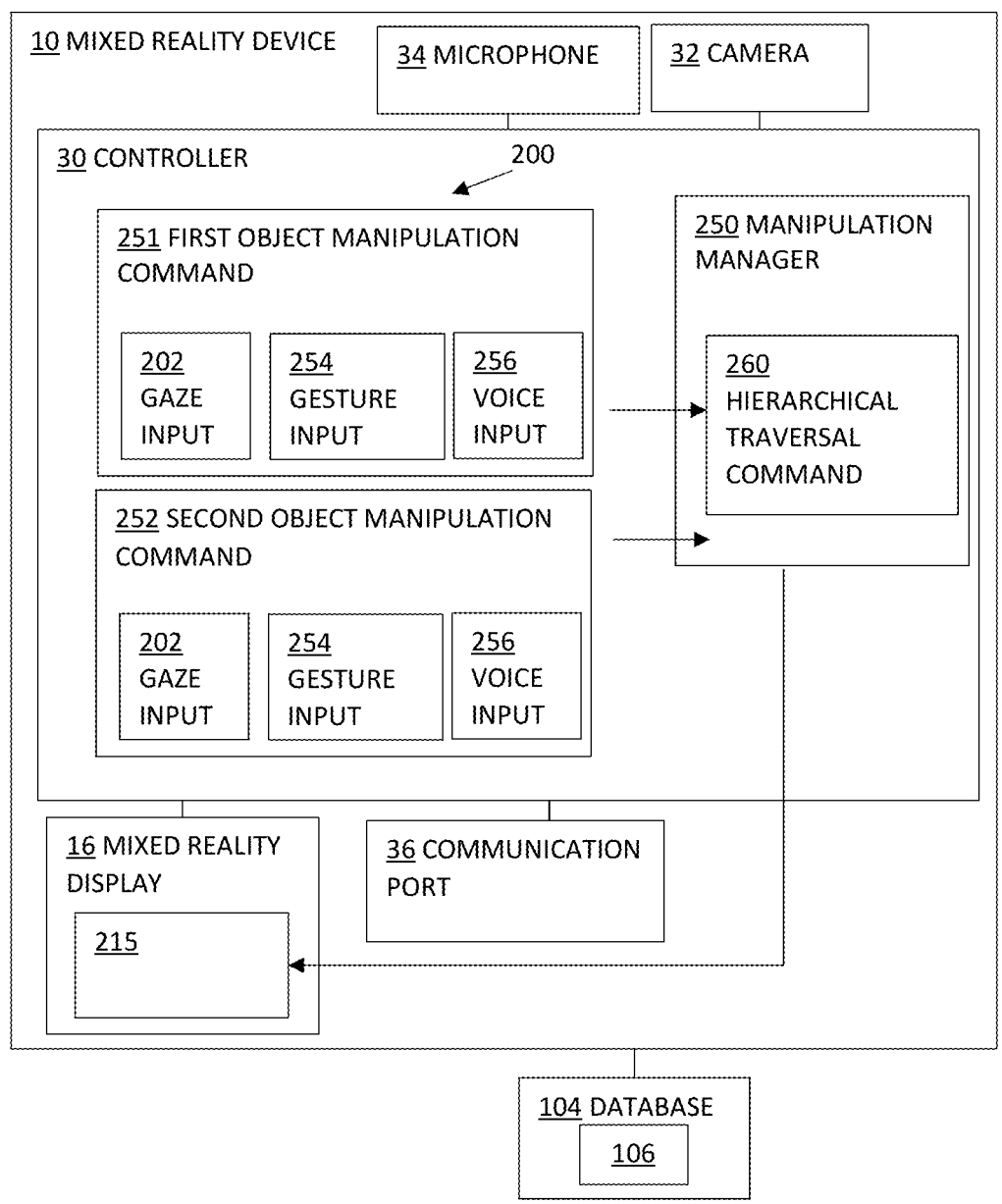
FIG. 8 illustrates a schematic representation of a manipulation manager of the mixed reality device of FIG. 2, according to one arrangement.

With reference to FIG. 8, the mixed reality device 10 can be configured to allow user-manipulation of the image of the hierarchical data structure 15 in order to provide the user with a more intuitive spatial representation of the network data. For example, the mixed reality device 10 can include a manipulation manager 250 which is configured to provide the user with the ability to interact with the hierarchical data structure 15.

In one arrangement, the manipulation manager 250 is responsive to a combination of user-actions as object manipulation input 200. User-actions can be combined in a variety of ways such that each combination can result in a different manipulation or interaction with the virtual object 18. Accordingly, with such a configuration, the mixed reality device 10 allows the user to interact with the virtual object 18 in a relatively robust manner. For example, during operation, the manipulation manager 250 can receive, as the object manipulation input 200, a first object manipulation command 251 and a second object manipulation command 252 from the user to adjust the display of the hierarchical data structure 215 on the mixed reality display 16. For example, the mixed reality device 10 can be configured to receive gaze input 202 via the active cursor manager 220, gesture input 254 via the camera 32, and voice input 256 via the microphone 34. Accordingly, to allow user manipulation of the hierarchical data structure 15, the manipulation manager 250 can receive, as the first object manipulation command 251, one of a gaze input 202, gesture input 254, or voice input 256 from the user and can receive, as the second object manipulation command 252, one of a gaze input 202, gesture input 254, or voice input 256 from the user provided the second object manipulation command 252 is different from the first object manipulation command 251.

The manipulation manager 250 can be configured to provide a variety of adjustments to the display of the hierarchical data structure 215 based upon the user's object manipulation commands 251, 252. The following provides several example configurations of the manipulation manager 250 in response to corresponding example commands. It is noted that the combination of object manipulation commands 251, 252 and resulting manipulation or interaction with the virtual object 18 are presented by way of example only.

In one arrangement, the manipulation manager 250 is configured to dynamically adjust the display of the hierarchical data structure 215 based upon the combination of a gesture input 254 and a voice input 256. Table 1 provides several example types of dynamic adjustments that can be made to the display of the hierarchical data structure 215 based upon the corresponding gesture input 254 and voice input 256.

TABLE 1

Spatial manipulation based on a combination of voice and gesture inputs.

| DYNAMIC ADJUSTMENT | FUNCTION |
| --- | --- |
| Moving | Changes the position of the hierarchical data structure 215 in environment following a corresponding voice command as the voice input 256 and following a drag/drop gesture as the gesture input 254. |
| Rotating | Rotates the hierarchical data structure 215 around its spatial center in horizontal and/or vertical plains by calling corresponding voice command and following drag/drop gesture. |
| Scaling | Scales the size of hierarchical data structure 215 following a corresponding voice command as the voice input 256 and following a drag/drop gesture as the gesture input 254. |
| Center | Sets the position of hierarchical data structure 215 in front of the user's gaze direction following a corresponding voice command as the voice input 256. |
| Moving node | Relocates the position of a chosen node of the hierarchical data structure 215 relative to other elements of the hierarchical data structure 215 following a corresponding voice command as the voice input 256 and following drag/drop gesture as the gesture input 254. |

In one arrangement, the manipulation manager 250 is configured to display interactive help (e.g., returning answers to user's questions, searching of the nodes 17 by some attribute value (name, type, predicate, location), or finding the longest/shortest path between nodes 17 in the hierarchical data structure 15, for example) relative to the hierarchical data structure 215 based upon the combination of a gaze input 202 and a voice input 256. Table 2 provides several examples of interactive help that can be provided relative to the display of the hierarchical data structure 215 based upon the corresponding gaze input 202 and the voice input 256.

TABLE 2

Interactive help displayed based on a combination of voice and gaze inputs.

| INTERACTIVE HELP | FUNCTION |
| --- | --- |
| Search of the node by name | Recognition and highlighting a node by its name, following a corresponding voice command as the voice input 256. |
| Navigation | Flashes map of a present location in the hierarchical tree of the visualized hierarchical data structure 215 following a corresponding voice command as the voice input 256. |
| Voice commands | Flashes the name of the voice command that was recognized as the voice input 356. |
| Commands manual | Flashes a list of the voice commands and a manual on their usage following a corresponding voice command as the voice input 256. |
| History | Returns the network to previous spatial state following a corresponding voice command as the voice input 256. After every spatial manipulation, when the hierarchical data structure 215 changes its location, angle, or scale, the previous stage is written in memory. Previous stages can be accessed in response to a corresponding voice command as the voice input 256. |

In one arrangement, the manipulation manager 250 is configured to allow user traversal of the hierarchical data structure 15 based upon the combination of a gesture input 254 and a voice input 256 as a hierarchy traversal command 260. Table 3 provides several example types of dynamic adjustments that can be made to the display of the hierarchical data structure 215 based upon the corresponding gesture input 254 and voice input 256.

TABLE 3

Traversal of the hierarchical data structure based on a combination of gaze, gesture and voice inputs

| TRAVERSAL | FUNCTION |
| --- | --- |
| Return to root | Returns to the root position in the hierarchical data structure 215 by a corresponding voice command as the voice input 256. |
| Level down | Traverses lower in the hierarchical data structure 215 on a less abstract layer by a corresponding click gesture as the gesture input 254 on a selected cluster node. |
| Level up | Traverses higher in the hierarchical data structure 215 on a more abstract layer by a corresponding voice command as the voice input 256. |

Figure 9A:
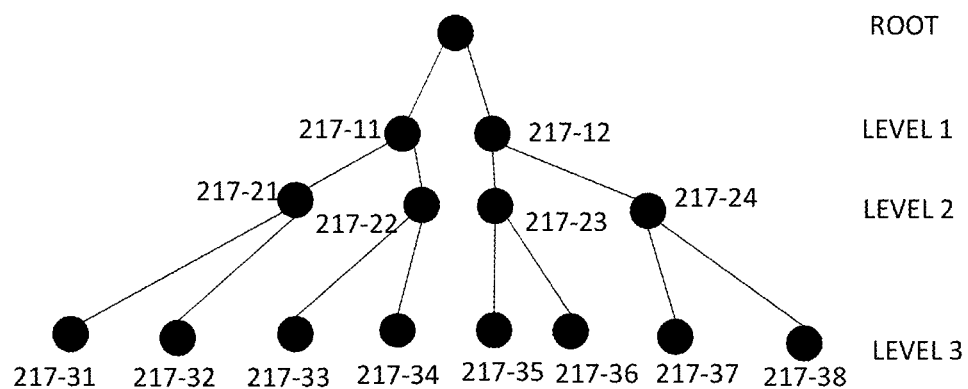
FIG. 9A illustrates a tree structure of a set of network data which shows the hierarchy of the data, according to one arrangement.

During operation, in response to receiving the hierarchy traversal command 260, the manipulation manager 250 is configured to adjust the display of a particular level of a hierarchical data structure 15. For example, FIG. 9A presents a tree structure of a set of network data which shows the hierarchy of the data (i.e., how the nodes are aggregated with each other for better representation of data). As shown, each node in the hierarchy has one parent from a higher level (e.g., and can include more than one parent for more sophisticated cases) and a children from a lower level. Accordingly, taking node 217-21 as an example, node 217-21 has node 217-31 and 217-32 as children and node 217-11 as a parent. Informational link 134 represents these relations among the nodes.

Figure 9B:
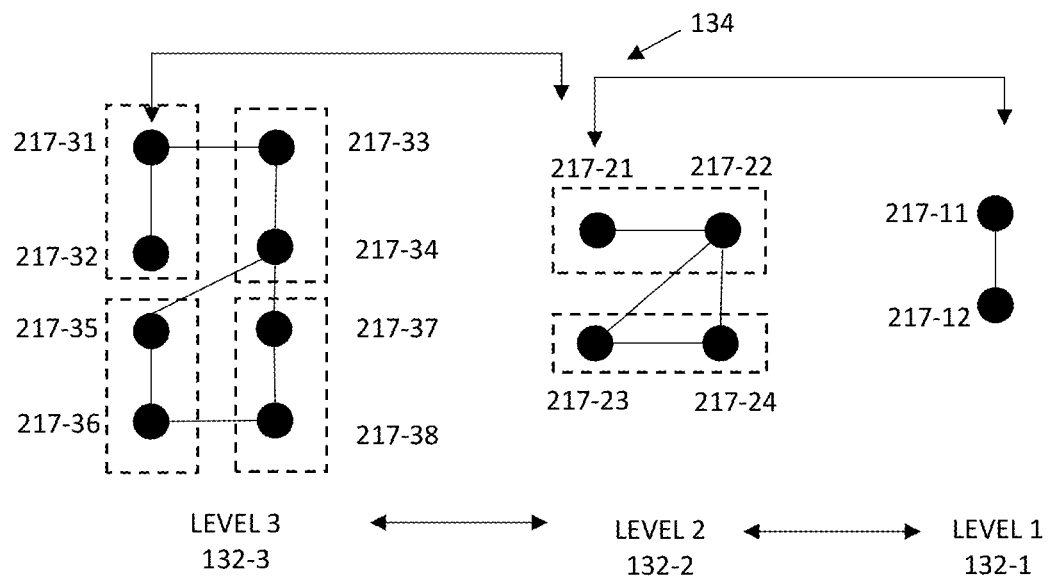
FIG. 9B illustrates aggregation of the nodes of FIG. 9A in accordance with hierarchical structuring, according to one arrangement.

FIG. 9B illustrates aggregation of the nodes 217 in accordance with hierarchical structuring. For example, the network data is aggregated hierarchically as Level 3 132-3, then Level 2 132-2 and Level 1 132-1. As a user traverses such a network using the hierarchy traversal command 260, the mixed reality device 10 is configured to display the information provided within the dash structures.

During operation, mixed reality device 10 provides Level 1 132-1 as part of the mixed reality display 16. Assume the manipulation manager 250 has received a hierarchy traversal command 260 to adjust the display of the hierarchical data structure 15 from Level 1 132-1 to Level 2 132-2. For example, the user can use a gesture input to click on the node 217-11. As a result, such a hierarchy traversal command 260 causes the manipulation manager 250 to call a network construction function (NET_CONSTRUCT) the node 217-11 as an input (e.g., NET_CONSTRUCT (217-11)). In response to receiving the hierarchy traversal command 260, the manipulation manager 250 is configured to identify the information link 134 between the first level 132-1 and the second level 132-2 of the hierarchical data structure 15. The information link 134 can be stored in either a local or external database 104. Based upon the information link 134, the manipulation manager 250 can identify the nodes 217-21 and 217-22 associated with the second level hierarchical data structure 15 (e.g., as stored by the network hierarchy manager 124) and can display nodes 217-21 and 217-22 as the second level 132-2 of the hierarchical data structure 15 on the mixed reality display 16. Here, the manipulation manager 250 provides traversal from a coarser-grain to a finer-grain view of the hierarchical data structure 15.

In one arrangement, the manipulation manager 250 is configured to provide traversal from a finer-grain to a coarser-grain view of a hierarchical data structure 15. For example, assume the case where the mixed reality device 10 provides nodes 217-31 and 217-32 of Level 3 132-3 as part of the mixed reality display 16. This is a result of the manipulation manager 250 having previously called a network construction function (e.g., NET_CONSTRUCT) with node 217-21 as an input (e.g., NET_CONSTRUCT (217-21)). In the case where the user wants to return to Level 2 132-2 to view nodes 217-21 and 217-22, the manipulation manager 250 knows only that the parent of nodes 217-31 and 217-32 is node 217-21, but, at the same time, can identify the parent of node 217-21, which is node 217-11. Using informational links 134 between the levels to go a level up, the manipulation manager 250 can identify the parent (node 217-11) of the parent (node 217-21) of node 217-31. Accordingly, when on a finer grain node, the manipulation manager 250 is configured to identify the parent node of a parent node.

In one arrangement, the manipulation manager 250 is configured to dynamically adjust the display of the hierarchical data structure 215 to show different modes associated with the hierarchical data structure 215 based upon a voice input 256. For example, the mixed reality device 10 can be configured to display a hierarchical data structure 15 in one of three spatial resolution modes: normal, standby, and skeleton. In normal mode, the mixed reality device 10 allows all manipulations to be applied to the hierarchical data structure 15. In standby mode, the mixed reality device 10 prohibits all manipulations to be applied to the hierarchical data structure 15. In one arrangement, the mixed reality device 10 is set to standby mode, by default and is switched to normal or skeleton mode for further manipulations. In skeleton mode, the mixed reality device 10 displays only the edges 19 of the hierarchical data structure 15. Table 4 provides examples of the modes that can be provided by the manipulation manager 250 in response to the corresponding commands.

TABLE 4

Display of spatial resolution modes of the hierarchical data structure based on a voice inputs

| MODE | FUNCTION |
| --- | --- |
| Normal mode | Sets the mode of the hierarchical data structure 215 when all the manipulations can be performed and all elements of the hierarchical data structure 215 are visible and the hierarchical data structure 215 has a fixed position. Normal mode is engaged following a corresponding voice command as the voice input 256. |
| Skeleton mode | Sets the mode of the hierarchical data structure 215when only edges are observed and other features of the mode are the same as normal mode provides. Skeleton mode is engaged following a corresponding voice command as the voice input 256. |
| Standby mode | Sets the mode of the hierarchical data structure 215 when no manipulations and transformations can be done. Standby mode is engaged following a corresponding voice command as the voice input 256. |

In one arrangement, the manipulation manager 250 is configured to show informational modes associated with the hierarchical data structure 215. As provided above, the active guidance manager 240 is configured to display identified attributes 242 of particular nodes 17 in the hierarchical data structure 15 as static information. For example, assume the case where the mixed reality device 10 displays cancer associated proteins or nodes 17 in the virtual object 18 as having a red halo and diabetic associated proteins as having a green halo. However, assume the user wants to see the tissue type where the genes of the corresponding proteins are expressed, but not the diseases. In such a case, the manipulation manager 250 is configured to switch the informational mode associated with the hierarchical data structure 215, such as by using a voice command as the voice input 256. In response to the voice input 256, the proteins or nodes 17 whose gene are expressed in a first tissue type, such as kidney tissue, can be highlighted in a first manner and the proteins or nodes 17 whose gene are expressed in a second tissue type, such as liver, can be highlighted in a second manner.

While various embodiments of the innovation have been particularly shown and described, it will be understood by those skilled in the art that various changes in form and details may be made therein without departing from the spirit and scope of the innovation as defined by the appended claims.

What is claimed is:

1. In a mixed reality device, a method for displaying a network structure, comprising:
   receiving, by the mixed reality device, topology data associated with a network and three-dimensional (3D) embedded network data associated with the network;
   constructing, by the mixed reality device, a hierarchical data structure from the topology data and the 3D embedded network data; and
   displaying, by the mixed reality device, a level of the hierarchical data structure as a virtual object in a 3D space on a mixed reality display, the level of the hierarchical data structure identifying a subset of nodes and a subset of edges of the hierarchical data structure, wherein each level of the hierarchical data structure comprises an information link between two neighbor levels, the information link configured to adjust a representation of the hierarchical data structure between a coarser-grain view (level k) and a finer-grain view (level k+1).

2. The method of claim 1, wherein constructing the hierarchical data structure from the topology data and the 3D embedded network data comprises:
   applying, by the mixed reality device, a clustering function to the topology data and the 3D embedded network data to define a set of nodes and a set of edges representing relationships among certain nodes of the set of nodes;
   defining, by the mixed reality device, a set of levels associated with the hierarchical data structure, each level of the set of levels representing a subset of nodes and a subset of edges of the hierarchical data structure; and
   defining, by the mixed reality device, an information link between two neighboring levels of the set of levels.

3. The method of claim 1, wherein:
   receiving topology data associated with the network and three-dimensional (3D) embedded network data associated with the network further comprises receiving, by the mixed reality device, secondary information related to at least one node associated with the network, the secondary information relating to a knowledge-domain feature of the at least one node; and constructing the hierarchical data structure from the topology data and the 3D embedded network data comprises constructing, by the mixed reality device, the hierarchical data structure from the topology data, the 3D embedded network data, and the secondary information.

4. The method of claim 1, further comprising:
receiving, by the mixed reality device, object manipulation input from a user; and
in response to the object manipulation input, adjusting, by the mixed reality device, the display of the level of the hierarchical data structure on the mixed reality display.

5. The method of claim 4, wherein receiving object manipulation input comprises receiving, by the mixed reality device, at least a first object manipulation command and a second object manipulation command.

6. The method of claim 5, wherein the first object manipulation command is selected from the group consisting of a gaze input, a gesture input, and a voice input and the second object manipulation command is selected from the group consisting of a gaze input, a gesture input, and a voice input, the first object manipulation command being distinct from the second object manipulation command.

7. The method of claim 4, wherein:
receiving object manipulation input from the user comprises:
  receiving, by the mixed reality device, a gaze input from the user, and
  identifying, by the mixed reality device, a 3D coordinate associated with the gaze input from the user; and
adjusting the display of the level of the hierarchical data structure on the mixed reality display comprises:
  comparing, by the mixed reality device, the 3D coordinate associated with the gaze input from the user with a 3D coordinate associated with each node of the subset of nodes, and
  when the 3D coordinate associated with the gaze input from the user corresponds to a 3D coordinate associated with a node of the subset of nodes, displaying, by the mixed reality device, node identification information associated with that node.

8. The method of claim 4, wherein:
receiving object manipulation input from the user comprises receiving, by the mixed reality device, the object manipulation input relating to a node of the subset of nodes; and
adjusting the display of the level of the hierarchical data structure on the mixed reality display comprises displaying, by the mixed reality device, secondary information related to the node of the subset of nodes.

9. The method of claim 4, wherein:
receiving object manipulation input from the user comprises receiving, by the mixed reality device, the object manipulation input relating to a primary node of the subset of nodes; and
adjusting the display of the level of the hierarchical data structure on the mixed reality display comprises identifying, by the mixed reality device, at least one secondary node of the subset of nodes having an identified attribute related to the primary node of the subset of nodes.

10. The method of claim 1, further comprising identifying, by the mixed reality device, at least one node of the subset of nodes having an identified attribute.

11. The method of claim 1, comprising:
receiving, by the mixed reality device, a hierarchy traversal command related to the hierarchical data structure;
in response to receiving the hierarchy traversal command, identifying, by the mixed reality device, an information link between the level of the hierarchical data structure and a second level of the hierarchical data structure; and
in response to identifying the information link, displaying, by the mixed reality device, the second level of the hierarchical data structure on the mixed reality display.

12. A mixed reality device, comprising:
a mixed reality display; and
a controller disposed in electrical communication with the mixed reality display, the controller having a processor disposed in electrical communication with a memory, the controller configured to:
receive topology data associated with a network and three-dimensional (3D) embedded network data associated with the network;
construct a hierarchical data structure from the topology data and the 3D embedded network data; and
display a level of the hierarchical data structure as a virtual object in a 3D space on the mixed reality display, the level of the hierarchical data structure identifying a subset of nodes and a subset of edges of the hierarchical data structure,
wherein each level of the hierarchical data structure comprises an information link between two neighbor levels, the information link configured to adjust a representation of the hierarchical data structure between a coarser-grain view (level k) and a finer-grain view (level k+1).

13. The mixed reality device of claim 12, wherein, when constructing the hierarchical data structure from the topology data and the 3D embedded network data, the controller is configured to:
apply a clustering function to the topology data and the 3D embedded network data to define a set of nodes and a set of edges representing relationships among certain nodes of the set of nodes;
define a set of levels associated with the hierarchical data structure, each level of the set of levels representing a subset of nodes and a subset of edges of the hierarchical data structure; and
define an information link between two neighboring levels of the set of levels.

14. The mixed reality device of claim 12, wherein:
when receiving topology data associated with the network and three-dimensional (3D) embedded network data associated with the network, the controller is configured to receive secondary information related to at least one node associated with the network, the secondary information relating to a knowledge-domain feature of the at least one node; and
when constructing the hierarchical data structure from the topology data and the 3D embedded network data, the controller is configured to construct the hierarchical data structure from the topology data, the 3D embedded network data, and the secondary information.

15. The mixed reality device of claim 12, wherein the controller is further configured:
receive object manipulation input from a user; and
in response to the object manipulation input, adjust the display of the level of the hierarchical data structure on the mixed reality display.

16. The mixed reality device of claim 15, wherein when receiving object manipulation input, the controller is configured to receive at least a first object manipulation command and a second object manipulation command.

17. The mixed reality device of claim 16, wherein the first object manipulation command is selected from the group consisting of a gaze input, a gesture input, and a voice input and the second object manipulation command is selected from the group consisting of a gaze input, a gesture input, and a voice input, the first object manipulation command being distinct from the second object manipulation command.

18. The mixed reality device of claim 15, wherein:
when receiving object manipulation input from the user, the controller is configured to:
receive a gaze input from the user, and
identify a 3D coordinate associated with the gaze input from the user; and
when adjusting the display of the level of the hierarchical data structure on the mixed reality display, the controller is configured to:
compare the 3D coordinate associated with the gaze input from the user with a 3D coordinate associated with each node of the subset of nodes, and
when the 3D coordinate associated with the gaze input from the user corresponds to a 3D coordinate associated with a node of the subset of nodes, display node identification information associated with that node.

19. The mixed reality device of claim 15, wherein:
when receiving object manipulation input from the user, the controller is configured to receive the object manipulation input relating to a node of the subset of nodes; and
when adjusting the display of the level of the hierarchical data structure on the mixed reality display, the controller is configured to display secondary information related to the node of the subset of nodes.

20. The mixed reality device of claim 15, wherein:
when receiving object manipulation input from the user, the controller is configured to receive the object manipulation input relating to a primary node of the subset of nodes; and
when adjusting the display of the level of the hierarchical data structure on the mixed reality display, the controller is configured to identify at least one secondary node of the subset of nodes having an identified attribute related to the primary node of the subset of nodes.

21. The mixed reality device of claim 12, wherein the controller is further configured to identify at least one node of the subset of nodes having an identified attribute.

22. The mixed reality device of claim 12, wherein the controller is configured to:
receive a hierarchy traversal command related to the hierarchical data structure;
in response to receiving the hierarchy traversal command, identify an information link between the level of the hierarchical data structure and a second level of the hierarchical data structure; and
in response to identifying the information link, display the second level of the hierarchical data structure on the mixed reality display.

23. A computer program product having a non-transitory computer-readable medium including computer program logic encoded thereon that, when performed on a controller of a mixed reality device causes the mixed reality device to:
receive topology data associated with a network and three-dimensional (3D) embedded network data associated with the network;
construct a hierarchical data structure from the topology data and the 3D embedded network data; and
display a level of the hierarchical data structure as a virtual object in a 3D space on a mixed reality display, the level of the hierarchical data structure identifying a subset of nodes and a subset of edges of the hierarchical data structure,
wherein each level of the hierarchical data structure comprises an information link between two neighbor levels, the information link configured to adjust a representation of the hierarchical data structure between a coarser-grain view (level k) and a finer-grain view (level k+1).

24. In a mixed reality device, a method for displaying a network structure, comprising:
receiving, by the mixed reality device, topology data associated with a network and three-dimensional (3D) embedded network data associated with the network;
receiving, by the mixed reality device, secondary information related to at least one node associated with the network, the secondary information relating to a knowledge-domain feature of the at least one node;
constructing, by the mixed reality device, a hierarchical data structure from the topology data, the 3D embedded network data, and the secondary information; and
displaying, by the mixed reality device, a level of the hierarchical data structure as a virtual object in a 3D space on a mixed reality display, the level of the hierarchical data structure identifying a subset of nodes and a subset of edges of the hierarchical data structure.

25. In a mixed reality device, a method for displaying a network structure, comprising:
receiving, by the mixed reality device, topology data associated with a network and three-dimensional (3D) embedded network data associated with the network;
constructing, by the mixed reality device, a hierarchical data structure from the topology data and the 3D embedded network data;
displaying, by the mixed reality device, a level of the hierarchical data structure as a virtual object in a 3D space on a mixed reality display, the level of the hierarchical data structure identifying a subset of nodes and a subset of edges of the hierarchical data structure;
receiving, by the mixed reality device, a hierarchy traversal command related to the hierarchical data structure;
in response to receiving the hierarchy traversal command, identifying, by the mixed reality device, an information link between the level of the hierarchical data structure and a second level of the hierarchical data structure; and
in response to identifying the information link, displaying, by the mixed reality device, the second level of the hierarchical data structure on the mixed reality display.

26. A mixed reality device, comprising:
a mixed reality display; and
a controller disposed in electrical communication with the mixed reality display, the controller having a processor disposed in electrical communication with a memory, the controller configured to:
receive topology data associated with a network and three-dimensional (3D) embedded network data associated with the network;

receive secondary information related to at least one node associated with the network, the secondary information relating to a knowledge-domain feature of the at least one nod;

construct a hierarchical data structure from the topology data, the 3D embedded network data, and the secondary information; and display a level of the hierarchical data structure as a virtual object in a 3D space on the mixed reality display, the level of the hierarchical data structure identifying a subset of nodes and a subset of edges of the hierarchical data structure.

27. A mixed reality device, comprising:

a mixed reality display; and a controller disposed in electrical communication with the mixed reality display, the controller having a processor disposed in electrical communication with a memory, the controller configured to:

receive topology data associated with a network and three-dimensional (3D) embedded network data associated with the network;

construct a hierarchical data structure from the topology data and the 3D embedded network data;

display a level of the hierarchical data structure as a virtual object in a 3D space on the mixed reality display, the level of the hierarchical data structure identifying a subset of nodes and a subset of edges of the hierarchical data structure;

receive a hierarchy traversal command related to the hierarchical data structure;

in response to receiving the hierarchy traversal command, identify an information link between the level of the hierarchical data structure and a second level of the hierarchical data structure; and in response to identifying the information link, display the second level of the hierarchical data structure on the mixed reality display.

28. A computer program product having a non-transitory computer-readable medium including computer program logic encoded thereon that, when performed on a controller of a mixed reality device causes the mixed reality device to:

receive topology data associated with a network and three-dimensional (3D) embedded network data associated with the network;

receive secondary information related to at least one node associated with the network, the secondary information relating to a knowledge-domain feature of the at least one node;

construct a hierarchical data structure from the topology data, the 3D embedded network data, and the secondary information; and display a level of the hierarchical data structure as a virtual object in a 3D space on a mixed reality display, the level of the hierarchical data structure identifying a subset of nodes and a subset of edges of the hierarchical data structure.

29. A computer program product having a non-transitory computer-readable medium including computer program logic encoded thereon that, when performed on a controller of a mixed reality device causes the mixed reality device to:

receive topology data associated with a network and three-dimensional (3D) embedded network data associated with the network;

construct a hierarchical data structure from the topology data and the 3D embedded network data;

display a level of the hierarchical data structure as a virtual object in a 3D space on a mixed reality display, the level of the hierarchical data structure identifying a subset of nodes and a subset of edges of the hierarchical data structure;

receive a hierarchy traversal command related to the hierarchical data structure;

in response to receiving the hierarchy traversal command, identify an information link between the level of the hierarchical data structure and a second level of the hierarchical data structure; and in response to identifying the information link, display the second level of the hierarchical data structure on the mixed reality display.

* * * * *